United States Patent
Iwabuchi et al.

(10) Patent No.: US 6,327,856 B1
(45) Date of Patent: Dec. 11, 2001

(54) CONTROL APPARATUS AND METHOD FOR PREMIXED COMPRESSION IGNITION TYPE INTERNAL COMBUSTION ENGINES

(75) Inventors: Yoshinori Iwabuchi, Kodaira; Toshitaka Yokokawa, Tokyo, both of (JP)

(73) Assignees: Mitsubishi Jidosha Kogyo Kabushiki Kaisha; Mitsubishi Jidosha Engineering Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/512,876

(22) Filed: Feb. 25, 2000

(30) Foreign Application Priority Data

Feb. 26, 1999 (JP) .................................................. 11-049455

(51) Int. Cl.⁷ .................................................. F02D 23/00
(52) U.S. Cl. .............................. 60/603; 60/602; 60/605.2
(58) Field of Search ........................... 60/602, 603, 605.2

(56) References Cited

U.S. PATENT DOCUMENTS 5,187,935 * 2/1993 Akiyama et al. .................. 60/603 X

FOREIGN PATENT DOCUMENTS

| 0160537 | * | 7/1986 | (JP) | ........................................ | 60/603 |
| 1-41629 | * | 2/1989 | (JP) | ........................................ | 60/603 |
| 2812236 B2 | | 8/1998 | (JP) . | | |

* cited by examiner

Primary Examiner—Hoang Nguyen

(57) ABSTRACT

A control apparatus for a premixed compression ignition type internal combustion engine having, a fuel injection valve for supplying a fuel into a combustion chamber of the engine, an operational condition detecting unit for detecting the operational condition of the engine, and a fuel injection control unit for controlling the fuel injection valve on the basis of the results of the detection carried out by the operational condition detecting unit, the fuel injection control unit controlling the fuel injection valve so that the supplying of a fuel to the combustion chamber is finished at least before a piston reaches a compression top dead center. The control apparatus includes an air supply unit for supplying pressurized air to the combustion chamber, and an air quantity control unit for controlling the air supply unit. The air quantity control unit controls a supply rate of the pressurized air so that the combustion of a gaseous mixture by self-ignition is carried out by a compression effect of the piston of the engine when the piston is in the vicinity of a compression top dead center. This control apparatus secures an output corresponding to the time of a high-load operation of the engine as the reduction of NOx is effected.

27 Claims, 6 Drawing Sheets a...Degree of opening of an accelerator,
b...Rotational speed of an engine,
c...Temperature of feed air,
d...Pressure of the feed air,
e...Temperature of water,
f...Temperature of an oil,
g...Operational history,
h...EGR ratio.

a...Degree of opening of an accelerator,
b...Rotational speed of an engine,
c...Temperature of feed air,
d...Pressure of the feed air,
e...Temperature of water,
f...Temperature of an oil,
g...Operational history,
h...EGR ratio.

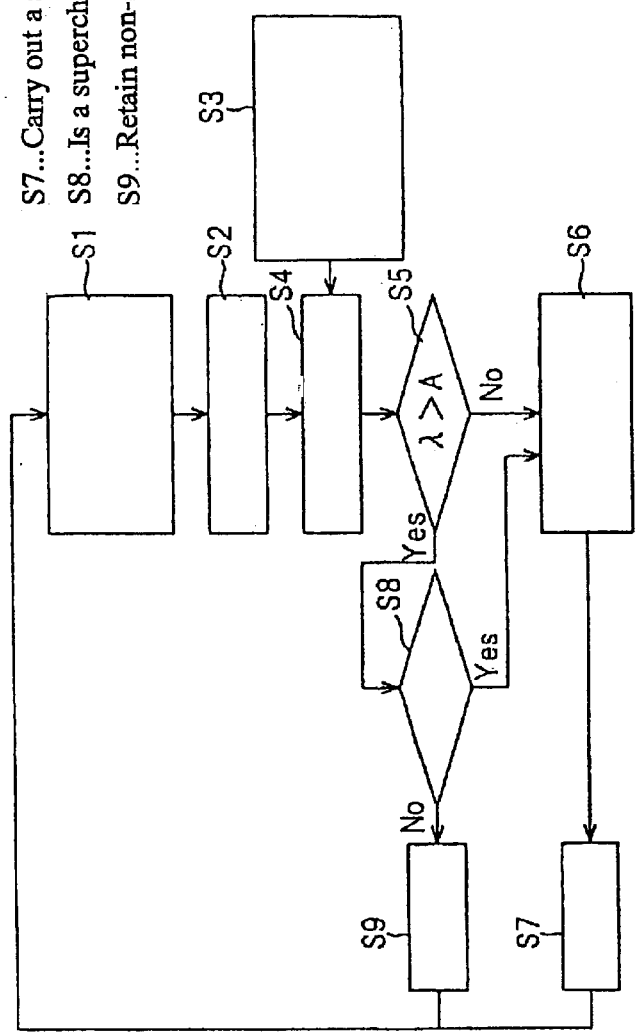

Fig. 3

S1...Rotational speed of the engine, quantity of a fuel, and temperature and pressure of feed air,
S2...Calculate an inside-cylinder average $\lambda$,
S3...Rotational speed of the engine, temperatures of the water and oil, operational history, and EGR ratio,
S4...Determine a judgement value A,
S6...Determine a supercharging pressure and control $\lambda$,
S7...Carry out a supercharging operation,
S8...Is a supercharging operation being carried out ?,
S9...Retain non-supercharging condition b...Rotational speed of the engine, i...Condition of the accelerator PRIOR ART    Comparison of fuel injection time
(a) Conventional diesel engine
(b) Premixed compression ignition type internal combustion engine

CONTROL APPARATUS AND METHOD FOR PREMIXED COMPRESSION IGNITION TYPE INTERNAL COMBUSTION ENGINES

BACKGROUND OF THE INVENTION

1. Field of the Invention

This invention relates to a premixed compression ignition type internal combustion engine, adapted to reduce a concentration of NOx discharged from a diesel engine (compression ignition type internal combustion engine) and increase an output level thereof.

2. Background Art

FIG. 6 is a time chart showing a comparison between the fuel injection time of a regular diesel engine and that of a premixed compression ignition type internal combustion engine, and FIG. 7 is a graph showing a comparison between a concentration of NOx discharged from the regular diesel engine and that of the premixed compression ignition type internal combustion engine.

As shown in FIG. 6(a), in the conventional diesel engine, a needle valve in a top portion of a combustion chamber is opened when a piston is in a position in the vicinity of a compression top dead center TDC, and fuel is injected (normal injection) into the combustion chamber. In such a conventional diesel engine, NOx of a comparatively high concentration is discharged for the following reasons.

The concentration of discharged NOx becomes highest under the condition that the fuel and air react with each other neither excessively nor insufficiently, i.e., when an excess air ratio $\lambda$ reaches a level in the vicinity of 1. Where the fuel is injected into a combustion chamber when the piston is positioned in the vicinity of the compression top dead center TDC in the conventional diesel engine, the fuel is burnt (diffusion combustion) as it is mixed with the ambient air and diffused into the interior of the combustion chamber. Accordingly, a region in which the excess air ratio $\lambda$ necessarily becomes 1 exists in this case in a process in which the fuel is mixed with the air, and NOx of a concentration higher than that in this region is discharged. Moreover, when an engine output level is increased by increasing, as shown in FIG. 7, the quantity of the fuel supplied to the combustion chamber, the concentration of discharged NOx increases in proportion to the increase in the quantity of the fuel.

Therefore, at present, a premixed compression ignition type internal combustion engine capable of greatly reducing the concentration of discharged NOx, as compared with such a conventional diesel engine, has been studied and developed. As illustrated in FIG. 6(b), the premixed compression ignition type internal combustion engine is an engine in which a fuel is injected early (when a piston is in the vicinity of a compression bottom dead center BDC) into a combustion chamber so as to finish the supplying of the fuel into the combustion chamber at least before the piston reaches the compression top dead center TDC. The fuel injected early into the combustion chamber is mixed sufficiently with the air in the combustion chamber by the time the piston moving from the fuel injection time has arrived at the compression top dead center TDC, the fuel being thereby put in a lean mixed state (lean state)

Namely, in the premixed compression ignition type internal combustion engine, the fuel and air are mixed with each other sufficiently, and they are put in a lean mixed state before the fuel is self-ignited by a compression effect of a piston when the piston reaches a position in the vicinity of a compression top dead center TDC. This gaseous mixture in a lean mixed state is compressed by the piston, whereby the fuel is self-ignited (multi-point simultaneous compression self-ignition combustion) simultaneously in multiple points in the combustion chamber when the piston is in the vicinity of the compression top dead center TDC. There is another premixed compression ignition type internal combustion engine in which a fuel is injected into a suction pipe and turned into a gaseous mixture, which is taken into a combustion chamber in a suction stroke.

In any case, in a premixed compression ignition type internal combustion engine, the fuel and air are mixed with each other in advance so as to put them in a lean mixed state in which an excess air ratio $\lambda$ is sufficiently larger than 1, and this gaseous mixture is thereafter burnt (lean combustion), so that the gaseous mixture is not burnt when the excess air ratio $\lambda$ is 1. Accordingly, in a premixed compression ignition type internal combustion engine, the concentration of discharged NOx decreases greatly as shown in FIG. 7 as compared with that in the conventional diesel engine, and extra-low NOx combustion is attained.

Especially, when light oil is used as a fuel in a premixed combustion ignition type internal combustion engine, a compression ratio is set lower than that in a regular diesel engine, whereby the time, at which a lean gaseous mixture is self-ignited, is regulated so that the self-ignition time is close to the time at which a piston reaches a compression top dead center TDC. The reason resides in that, when both the compression ratio and temperature are high, there is a fear of the occurrence of self-ignition of the lean gaseous mixture before the piston reaches a position in the vicinity of a compression top dead center TDC.

However, in the premixed compression ignition type internal combustion engine of the related art, a high load operation (high output operation) cannot be carried out since a decrease in the concentration of discharged NOx is attained by lean combustion.

Concretely speaking, in the case of a premixed compression ignition internal combustion engine, a ratio of the quantity of the air supplied to the interior of a combustion chamber to that of a fuel supplied thereto is satisfactory as shown in FIG. 7 in a low and intermediate load operation with respect to a purpose of reducing the concentration of discharged NOx by premixed compression ignition combustion. However, when an engine output is increased by increasing the quantity of fuel supplied to the combustion chamber, knocking occurs in a region (high load region) of an output level not lower than a certain level P, and the operation of the engine becomes difficult. The reason resides in that the air, the quantity of which corresponds to an increase of the quantity of the fuel, is not obtained when the output level is not lower than the level P, whereby an excess air ratio $\lambda$ comes close to 1. When knocking occurs, the concentration of discharged NOx increases up to a level not lower than a level usual in a regular diesel engine, and the vibration of the engine increases. This would cause engine trouble to occur.

In the premixed compression ignition type internal combustion engine, a control operation is carried out so that a lean mixed state can be maintained even when an output (load) increases, by setting the fuel injection time to an earlier time in accordance with an increase in the quantity of the fuel. In a suction stroke of the engine, the quantity of the air sucked due to a negative pressure in the combustion chamber in a suction stroke of the engine is substantially constant, so that, after all, the quantity of the air corresponding to an increase in the quantity of the fuel is not obtained in a region in which the engine output is not lower than a certain level. Consequently, the excess air ratio λ necessarily comes close to 1.

Even when the quantity of a fuel is increased in a conventional diesel engine until an excess air ratio λ reaches, for example, around 1.4, the engine can be operated without causing knocking to occur. However, in a premixed compression ignition type internal combustion engine, a lean combustion operation is carried out so as to reduce concentration of discharged Nox. Therefore, for example, in a basic test using a single-cylinder and not using an EGR (Exhaust Gas Recirculation) system, an operation limit exists at an excess air ratio λ of around 2.0–2.3. Therefore, the premixed compression ignition type internal combustion engine is inferior to a conventional diesel engine of the same displacement.

In view of the above-described related techniques, the present invention aims at providing a premixed compression ignition type internal combustion engine capable of retaining a lean mixed state by securing the quantity of the air which corresponds (not causing knocking to occur) to that of the fuel supplied to the interior of the combustion chamber, even at a high load time; and expanding an output range with extra-low NOx combustion ratio maintained.

Although Japanese Patent No. 2812236 discloses techniques concerning a premixed compression ignition type internal combustion engine, a supercharger like that used in the present invention is not provided. Therefore, an operational region (for example, a high load region) in which the quantity of the air is insufficient with respect to that of the fuel) exists, and, in this operational region, knocking occurs in some cases.

SUMMARY OF THE INVENTION

The present invention has been made in view of the above circumstances and provides a control apparatus for premixed compression ignition type internal combustion engines, and a control method for the same. According to one aspect of the present invention, the premixed compression ignition type internal combustion engine in the invention has a premixed compression ignition type internal combustion engine which includes a fuel injection valve provided in the engine, a detecting unit for detecting the operational condition of the engine, a fuel injection control unit for controlling the fuel injection valve on the basis of the results of the detection of the operational condition detecting unit, the fuel injection control unit controlling the fuel injection valve so as to finish supplying of a fuel to a combustion chamber at least by the time a piston has reached a compression top dead center, an air supply unit capable of supplying compressed air to the combustion chamber, and an air quantity control unit for controlling the air supply unit, the air quantity control unit controlling the quantity of the air so that the combustion of a gaseous mixture based on the self-ignition thereof is carried out owing to a compression effect of the piston of the engine when the piston is in the vicinity of a compression top dead center.

Therefore, according to this engine in the present invention, the quantity of the air can be controlled by controlling the air supply unit by the air quantity control unit, in such a manner that the combustion operation based on the self-ignition of the gaseous mixture is carried out when the piston of the engine is in a position in the vicinity of a compression top dead center owing to the compression effect of the piston. Accordingly, it is possible in the present invention to carry out a premixed compression ignition combustion, in which the concentration of discharged NOx is low, in the entire operational region of the engine, and secure an output corresponding to a high load region of the engine as the occurrence of knocking is prevented.

According to another aspect of the present invention, the control apparatus for premixed compression ignition type internal combustion engines has a control apparatus including an inside-cylinder average excess air ratio calculating unit adapted to calculate an average excess air ratio λ of the engine on the basis of the results of detection obtained by the operational condition detecting unit. The air quantity control unit controlling the air supply unit on the basis of an average excess air ratio λ calculated by the inside-cylinder average excess air ratio calculating unit. As a result, in this control apparatus according to the invention, the quantity of the air supplied to the combustion chamber can be secured satisfactorily even at the time of a high output level since the air supply unit is controlled on the basis of the calculated average excess air ratio λ.

According to still another aspect of the present invention, the control apparatus for premixed compression ignition type internal combustion engines has a control apparatus including a target excess air ratio setting unit for setting a target excess air ratio λa on the basis of the results of detection by the operational condition detecting unit, the target excess air ratio λa being set as a value at which knocking does not occur. The air quantity control unit controls the air supply unit so as to have the same supply pressurized feed air when the average excess air ratio λ calculated by the inside-cylinder average excess air ratio calculating unit is smaller than the target excess air ratio λa set by the target excess air ratio setting unit.

Therefore, since, in this control apparatus according to the invention, the pressurized feed air is supplied by controlling the air supply unit when the calculated average excess air ratio λ is smaller than the set target excess air ratio λa, the air is not supplied to the combustion chamber while the pressurized air is not required but it can supply the air only in the condition in which the pressurized air is required. This enables the quantity of the air which corresponds to the operational condition of the engine to be supplied to the combustion chamber neither excessively nor insufficiently.

In this control apparatus according to the present invention, the air supply unit is controlled only when the average excess air ratio is smaller than the target excess air ratio λa, so that the suppression of a loss of an engine output for pressurizing the air and a decrease in the fuel consumption can be attained.

According to a further aspect of the present invention, the control apparatus for premixed compression ignition type internal combustion engines has a control apparatus in which the operational condition detecting unit includes an engine load detecting unit for detecting a load of an engine. The air quantity control unit controlling the air supply unit in accordance with a load detected by the load detecting unit. Consequently, since, in this control apparatus according to the invention, the air supply unit is controlled in accordance with a load detected by the engine load detecting unit, the quantity of the air supplied to the combustion chamber can be secured satisfactorily with respect to the engine load as well.

According to another aspect of the present invention, the control apparatus for premixed compression ignition type internal combustion engines has a control apparatus in which the air quantity control means controls the air supply unit when an engine load detected by the engine load detecting unit exceeds a preset predetermined level, pressurized air being thereby supplied to the combustion chamber. As a result, in this control apparatus according to the present invention, pressurized air is supplied with the air supply unit controlled when the detected engine load exceeds a preset predetermined level, the pressurized air being therefore not supplied to the combustion chamber while it is not required, the pressurized air being supplied thereto only when it is required. Therefore, the air, the quantity of which corresponds to the load condition of the engine, can be supplied neither excessively nor insufficiently to the interior of the combustion chamber. Therefore, in this mode of the invention, the quantity of the air which corresponds to the load condition of the engine can be supplied to the combustion chamber neither excessively nor insufficiently, so that premixed compression ignition combustion (extra-low NOx combustion), which enables the attainment of a high output corresponding to the quantity of the fuel proportional to an increase in the engine load, is effected with the occurrence of knocking prevented even during a high load operation of the engine, and, the suppression of a loss of engine output and the reduction of fuel consumption can be attained without carrying out wasteful supercharging during a low load operation.

BRIEF DESCRIPTION OF THE DRAWINGS

The present invention will become more fully understood from the detailed description given hereinbelow and the accompanying drawing which are given by way of illustration only, and thus are not limitative of the present invention, and wherein:

FIG. 3 is a flow chart showing the content of the processing of ECU for the premixed compression ignition type internal combustion engine;

DETAILED DESCRIPTION OF THE INVENTION

The modes of embodiment of the present invention will now be described on the basis of the drawings.

Figure 1:
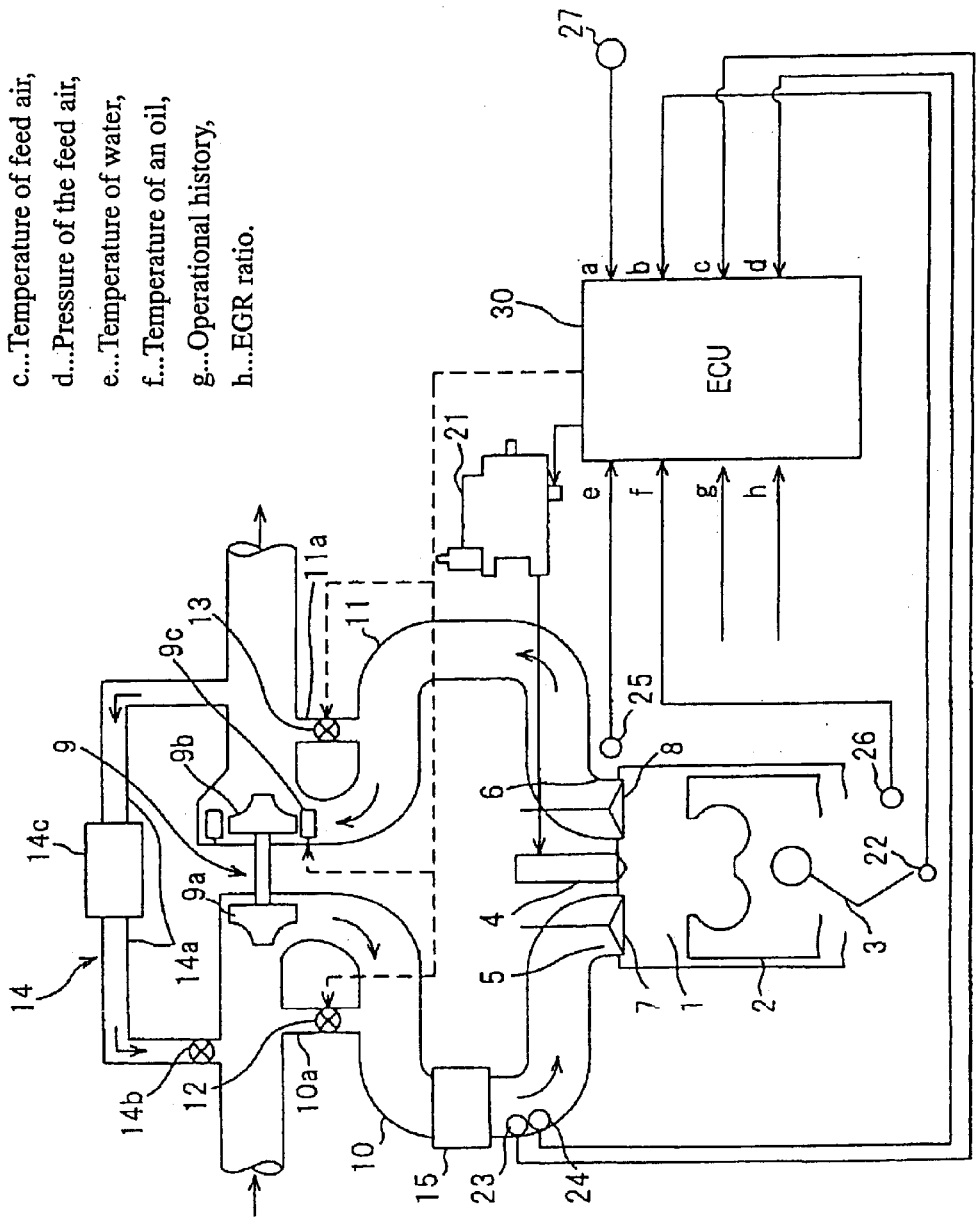
FIG. 1 is a construction diagram of a system of the premixed compression ignition type internal combustion engine in a mode of embodiment of the present invention.
Figure 2:
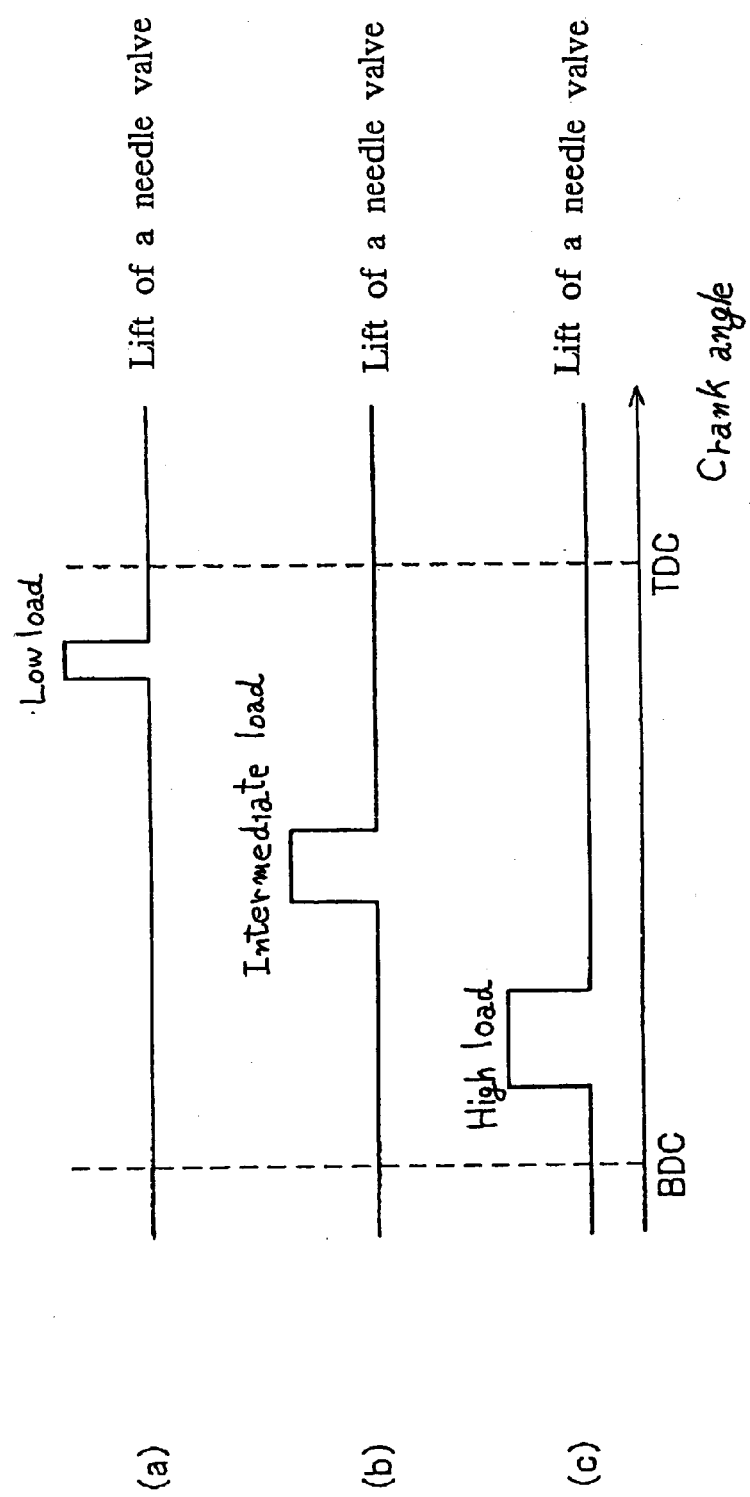
FIG. 2 is a time chart showing the early injection time of the premixed compression ignition type internal combustion engine.
Figure 4:
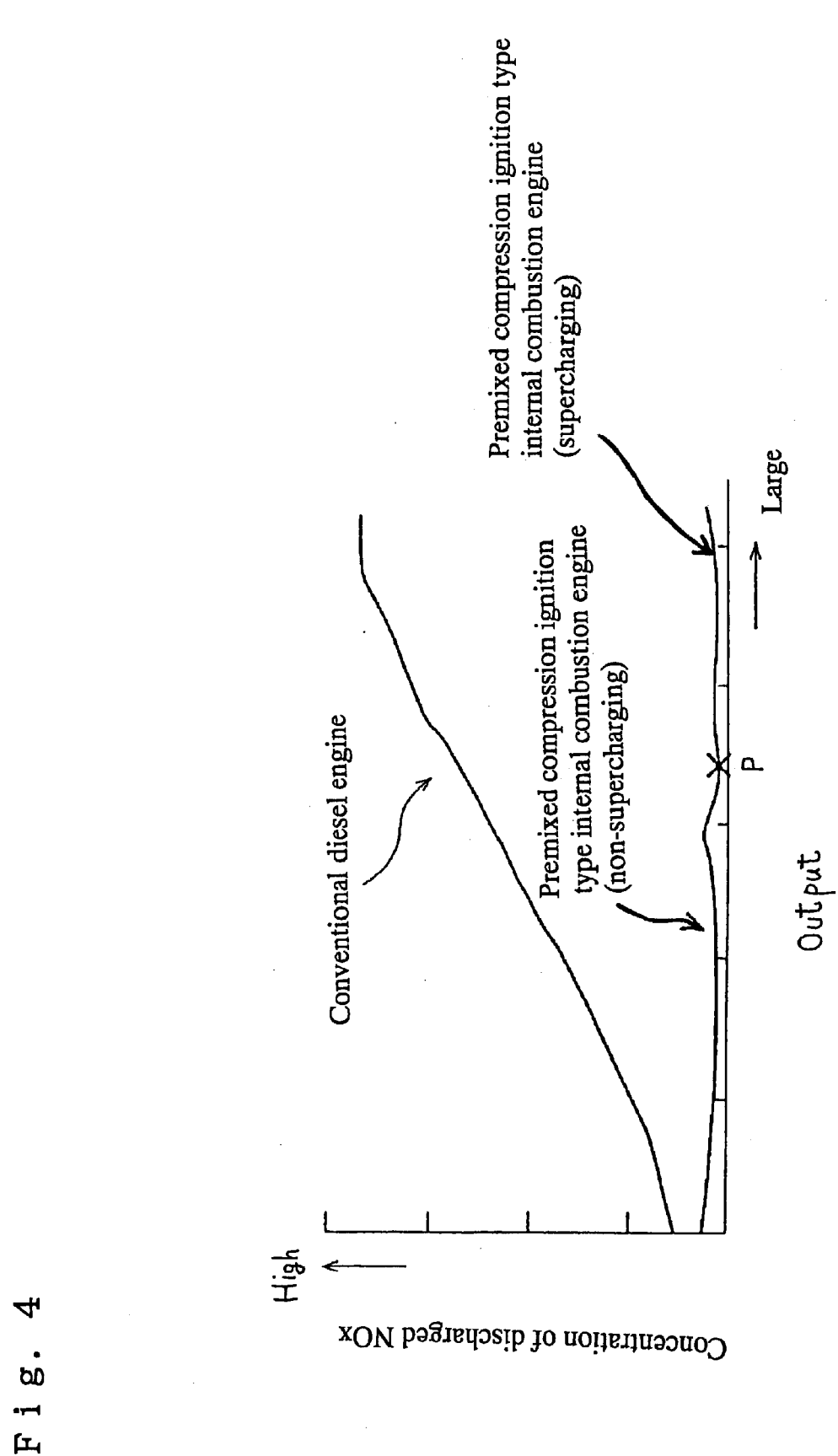
FIG. 4 is a graph showing a comparison between the exhaust concentration of NOx from the premixed compression ignition type internal combustion engine and that of NOx from a regular diesel engine.

FIG. 1 is a construction diagram of a system of the premixed compression ignition type internal combustion engine in a mode of embodiment of the present invention, FIG. 2 is a time chart showing the early injection time of the premixed compression ignition type internal combustion engine, FIG. 3 is a flow chart showing the content of a process carried out by an ECU for the premixed combustion ignition internal combustion engine, and FIG. 4 is a graph showing a comparison between the concentration of Nox discharged from the premixed compression ignition type internal combustion engine and that of Nox in the regular diesel engine.

Referring to FIG. 1, a reference numeral 1 denotes a combustion chamber of a cylinder, in which a combustion chamber 1 and a piston 2 are provided so that the piston 2 can be moved reciprocatingly in the vertical direction. The piston 2 is connected to a crankshaft (not shown) via a connecting rod 3.

A fuel injection valve 4 is provided at a central part of a top portion of the combustion chamber. When a fuel is fed from a fuel injection pump 21, the fuel injection valve 4 is opened, and the fuel is injected into the combustion chamber. The opening time of this fuel injection valve 4, i.e. the time at which the fuel is injected early into the combustion 5 chamber 1, is regulated to the time corresponding to the load condition of the engine, by a fuel injection unit control operation carried out by a controller (which will hereinafter be referred to as an "ECU") on the basis of the load condition of the engine.

Namely, as in concrete examples of early injection time shown in FIGS. 2a, 2b, and 2c, at the time of a low engine load, the fuel injection valve 4 is opened when the piston is in the vicinity of a compression top dead center TDC, to cause the fuel injection to be carried out; at the time of an intermediate engine load, the fuel injection valve 4 is opened when the piston is in a position in the vicinity of the position of 90 degrees before the compression top dead center TDC, to cause the fuel injection to be carried out; and at the time of a high engine load, the fuel injection valve 4 is opened when the piston is in the vicinity of a compression bottom dead center BDC, to cause the fuel injection to be carried out. In any of the above engine load conditions, the supplying of the fuel into the interior of the combustion chamber 1 is finished at least before the piston reaches the compression top dead center TDC. The ECU30 controls the fuel injection pump 21 to extend the time during which the fuel injection valve 4 is opened, in proportion to the level of the engine load as shown in FIGS. 2a, 2b, and 2c, whereby the quantity of the fuel supplied to the interior of the combustion chamber 1 is increased accordingly.

At the left and right side parts of a top portion of the combustion chamber, a suction port 5 and an exhaust port 6 are provided. The suction port 5 and exhaust port 6 are provided with a suction valve 7 and an exhaust valve 8, respectively. The suction valve 7 and exhaust valve 8 are driven by cams of cam shafts (not shown), and open the suction port 5 and exhaust port 6, respectively.

A suction-exhaust system is provided with a VG (Variable Geometry: Variable nozzle vane is additionally provided) turbocharger 9 as a supercharger (air supply unit) capable of regulating a supercharging pressure. Namely, a suction pipe 10, communicating with the suction port 5, is provided with a compressor 9a of the VG turbocharger 9, while an exhaust pipe 11, communicating with the exhaust port 6, is provided with an exhaust turbine 9b of the VG turbocharger 9, and a variable nozzle vane 9c is provided on the side of this exhaust turbine 9b.

The suction pipe 10 is provided with a bypass pipe 10a shunting the compressor 9a of the VG turbocharger 9, and a feed air bypassing control valve 12 is provided in this bypass pipe 10a. The exhaust pipe 11 is provided with a bypass pipe 11a shunting the exhaust turbine 9b of the VG turbocharger 9, and an exhaust gas bypassing control valve 13 is provided in this bypass pipe 11a.

Accordingly, when the exhaust turbine 9b is driven by an exhaust gas discharged from the combustion chamber 1 via the exhaust port 6, the compressor 9a is also rotated, whereby compressed air (supercharged air) is supplied to the interior of the combustion chamber 1. Namely, a combination (feed air) of the suction air sucked due to a negative pressure in the combustion chamber 1 during a suction stroke of the engine and the supercharged air supplied by the VG turbocharger 9 is fed into the combustion chamber 1. The supercharging pressure during the supercharging time is controlled (which will be described in detail later) so that it attains a desired level, by an operation of the ECU30 for controlling the variable nozzle vane 9c and the control valves 12, 13 of the VG turbocharger 9.

A suction system is provided with an EGR unit 14. The EGR unit 14 is formed of a pipe 14a that connects the suction pipe 10 and exhaust pipe 11 together, an EGR cooler 14c provided in an intermediate portion of the pipe 14a, and a control valve 14b provided in a downstream portion of the pipe 14a.

Therefore, in the EGR unit 14, a part (EGR gas) of the exhaust gas flowing in the exhaust pipe 11 is cooled in the EGR cooler 14c via the pipe 14a, and recirculated into the suction pipe 10. This recirculated EGR gas is mixed with the feed air supplied to the combustion chamber 1. The EGR ratio (percentage of EGR gas contained in the feed air) during this time can be regulated suitably by varying a flow rate of the EGR gas by controlling the control valve 14b by an EGR control unit (not shown).

The suction system is also provided with an inter-cooler 15. This inter-cooler 15 is provided in the suction pipe 10 so as to be positioned on the downstream side of the compressor 9a of the VG turbocharger 9. Accordingly, the air (supercharged air) compressed by the VG turbocharger 9 is supplied to the interior of the combustion chamber 1 after it cooled in the inter-cooler 15. The temperature of the air (supercharged air) compressed by the VG turbocharger 9 increases. Therefore, when the supercharged air is supplied as it is to the interior of the combustion chamber 1, it exerts influence upon the fuel ignition time, i.e., the ignition time is quickened. As a result, the combustion of a gaseous mixture starts to burn at an instant at which the fuel and air are not yet sufficiently mixed, to cause deterioration of the fuel consumption to occur. To prevent this inconvenience, the supercharging air is cooled in the inter-cooler 15.

In this mode of embodiment, the VG turbocharger 9 and control valves 12, 13 are controlled by the ECU30, whereby the excess air ratio $\lambda$ is maintained at a level not lower than a predetermined level irrespective of the condition of the engine load.

Namely, in order to maintain the excess air ratio $\lambda$ at a level not lower than a predetermined level by regulating a supercharging pressure, the ECU 30 receives inputs of a degree of opening of an accelerator (a), a rotational speed of the engine (b), a temperature of the feed air (c), a pressure of the feed air (d), a temperature of water (e), a temperature of oil (f), operational history (g), and an EGR ratio (h), as shown in FIG. 1.

The quantity of the fuel is calculated with reference to a map (not shown) in the ECU30 on the basis of the degree of opening of the accelerator (a) and the rotational speed of the engine (b). The degree of opening of the accelerator (a) is detected by a degree of opening of accelerator sensor 27, and the rotational speed of the engine (b) is detected by a crank angle sensor 22 provided on a crankshaft (not shown). The temperature of the feed air (c) and the pressure of the feed air (d) are detected by a feed air temperature sensor 23 and a feed air pressure sensor 24 which, are provided in the suction pipe 10, respectively.

The temperature of water (e) is the temperature of the engine cooling water, which is detected by a water temperature sensor 25 provided in an engine cooling water system (not shown). The temperature of oil (f) is the temperature of a lubricating oil, which is detected by an oil temperature sensor 26 provided in an engine lubricating oil system (not shown).

The operational history (g) is the history up to the present time of the load condition of the engine, i.e. the history of the engine as to whether it has thus far been in an idling condition (non-loaded operational condition) or a high-speed running condition (high load operational condition). This operational history is monitored by an operational history monitor (not shown), an output from which is supplied to the ECU30. The EGR ratio (h) is outputted from an EGR control unit (not shown) to the ECU30.

The process executed in the ECU30 is as shown in the flow chart of FIG. 3. First, as shown in the flow chart, the ECU30 receives (S1) a degree of opening of accelerator (a), a rotational speed of engine (b), a temperature of feed air (c), and a pressure of feed air (d) from the degree of opening of accelerator sensor 27, crank angle sensor 22, feed air temperature sensor (air temperature sensor) 23, and feed air pressure sensor (air pressure sensor) 24, and an average excess air ratio $\lambda$ in a cylinder (interior of the combustion chamber) is calculated (S2: Inside-cylinder average excess air ratio calculating unit) on the basis of this information. These sensors 22, 23, 24, 27 are operational condition detecting units for detecting the operational condition of the engine.

Then, in addition to the above rotational speed of the engine (b), etc., water temperature (e) and oil temperature (f) are inputted from the water temperature sensor 25 and oil temperature sensor (26), operational history (g) is inputted from the operational history monitor, and EGR ratio (h) is inputted from the EGR control unit (S3). A judgement value A (target excess air ratio $\lambda$a), which is used to judge the inside-cylinder average excess air ratio $\lambda$ as to whether it is a value not having a fear of causing knocking to occur or not, is then determined (S4: Target excess air ratio setting unit) on the basis of this information. Just as the above-mentioned sensors, these sensors 25, 26 are also operational condition detecting units for detecting the operational condition of the engine.

For example, when a judgement that the engine is in a high load operational condition with the inside-cylinder temperature of the engine high is given in view of the operational history (g), etc., the engine is in the condition in which knocking is liable to occur. Accordingly, a judgment value A is set to a slightly higher level so that a ratio of the quantity of the air to that of the fuel becomes slightly larger. Conversely, when a judgement that the engine is in a low-loaded operational condition with the inside-cylinder temperature of the engine low is given in view of the operational history (g), the judgement value A is set to a slightly lower level. It is considered that the operational history (g) does not have so large an influence upon determination of the judgement value A, and that it more or less corrects the judgement value A.

When EGR (exhaust gas recirculation) is carried out by the EGR unit 14, the judgement value A is set to a slightly lower level in accordance with the EGR ratio h. The reason resides in that, when EGR is carried out, the combustion temperature in the combustion chamber 1 becomes comparatively slow, whereby knocking becomes hard to occur, i.e., even when the excess air ratio λ is comparatively small, knocking does not occur. It is considered that the EGR ratio (h) has a very large influence upon the determination of the judgement value A.

When the judgement value A is determined (S4), this judgement value A and inside-cylinder average excess air ratio λ are compared (S5). As a result, when the inside-cylinder average excess air ratio λ is judged larger than the judgement value A, i.e., when a judgement that, since a sufficient quantity of air exists with respect to the quantity of the fuel supplied to the interior of the combustion chamber 1, knocking does not occur as occasion stands is given, the present condition is judged (S8) as to whether a supercharging operation is being carried out by the VG turbocharger 9 or not.

When a judgement that a supercharging operation is not being carried out at present is given, the non-supercharging condition is retained (S9). Namely, the control valves 12, 13 are opened to cause the air to bypass the VG turbocharger 9.

When a judgement that the inside-cylinder average excess air ratio λ is not larger than the judgement value A is given as a result of the comparison (S5) between the judgement value A and inside-cylinder average excess air ratio λ, i.e., when a judgement that the quantity of the air is so insufficient that knocking is likely to occur is given, a supercharging pressure corresponding to the judgement value A (corresponding to the quantity of the fuel) is determined (target air pressure setting unit), and the variable nozzle vane 9c and control valves 12, 13 of the VG turbocharger 9 are controlled to attain this supercharging pressure, whereby the excess air ratio λ is kept (S6, S7) not smaller than the judgement value A (λ>A). Namely, the quantity of the air counterbalancing (not causing knocking to occur) that of the fuel supplied to the interior of the combustion chamber 1 is secured.

For example, when EGR is not carried out, the supercharging pressure is controlled so that the excess air ratio λ is retained within the range of 2.0<λ<2.5. Namely, although the judgement value A and λ controlling value are about 2.5 under the non-EGR executing conditions, it varies in the range of 2.0–2.5 depending upon various conditions for the engine including the rotational speed thereof, etc. Under the EGR executing conditions, the excess air ratio has a value lightly smaller than these values. From a knocking preventing point of view, a sufficient quantity of air with respect to he quantity of the fuel meets the purpose. An upper limit of the excess air ratio λ is set to 2.5 to remove a wasteful supercharging operation and prevent an accidental fire ascribed to an excess of the quantity of the air.

When a judgement that a supercharging operation is being carried out is given as a result of the judgement (S8), the excess air ratio λ is retained, owing to the supercharging operation, in a predetermined range which does not cause knocking to occur, so that the supercharging condition continues to be maintained as it is (S6, S7).

When, in this case, the quantity of air is excessively large with respect to that of the fuel to cause the excess air ratio λ to exceed 2.5, the excess air ratio λ is regulated so as to be set within the range of 2.0–2.5 by weakening the supercharging power by controlling the variable nozzle vane 9c of the VG turbocharger 9 or by moving the control valves 12, 13 in the opening direction. Accordingly, when the engine load becomes low, so that the ratio of the quantity of the air to that of the fuel becomes very large, the variable nozzle vane 9c of the VG turbocharger 9 is fully opened, and the control valves 12, 13 are opened to attain a non-supercharging condition. When the judgement (S8) is made after the non-supercharging condition is thus attained, the result of this judgement becomes affirmative, and the supercharging condition is retained (S9).

According to the premixed compression ignition type internal combustion engine in this mode of embodiment as described above, the quantity of air supplied to the interior of the combustion chamber 1 can be secured satisfactorily owing to the supercharging effect of the VG turbocharger 9 without being influenced by the operational condition of the engine. Accordingly, the quantity of air does not become insufficient with respect to that of the fuel supplied to the interior of the combustion chamber 1. Therefore, lean combustion in the interior of the combustion chamber can be maintained, and the occurrence of knocking is prevented. This enables a premixed compression ignition combustion with a low concentration discharged NOx in the entire operational region of the engine to be carried out.

Figure 7:
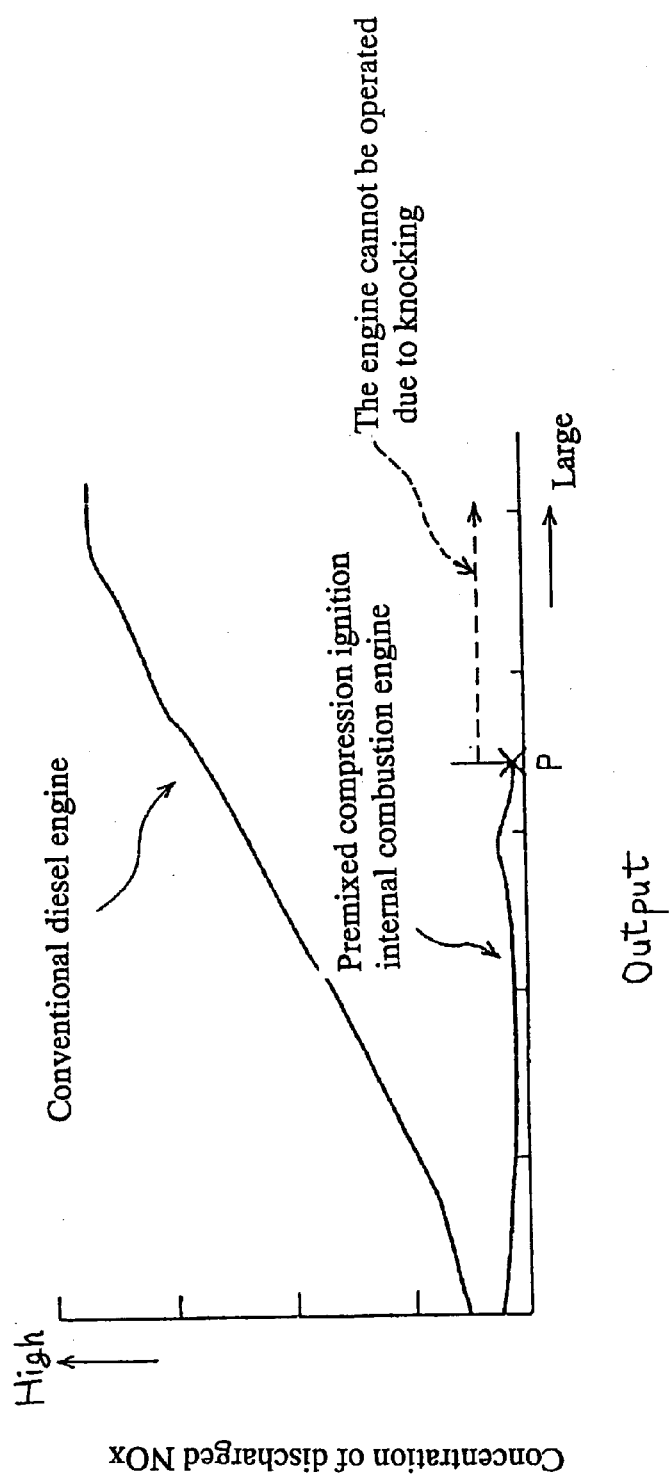
FIG. 7 is a graph showing a comparison between the exhaust concentration of NOx from the regular diesel engine and that of NOx from the premixed compression ignition type internal combustion engine.

In a premixed compression ignition type internal combustion engine of the related art, the quantity of air with respect to that of the fuel becomes insufficient in an engine output region of not lower than an output level of P as illustrated in FIG. 7, and knocking occurs, so that this engine becomes unable to operate with an increase in the concentration of discharged NOx brought about. However, in the premixed compression ignition type internal combustion engine in the present embodiment, a sufficient (not causing knocking to occur) quantity of air can be secured (the excess air ratio λ can be kept high) with respect to the quantity of the fuel owing to the supercharging effect of the VG turbocharger 9 even in a high output region (operational condition of the engine in which the quantity of the fuel is large) of an output level of not lower than P, in which the engine of the related art cannot be operated as illustrated in FIG. 7 due to the occurrence of knocking. Therefore, in the preferred embodiment, the quantity of the fuel can be increased as the extra-low NOx combustion is maintained, so that an output range of the premixed compression ignition type internal combustion engine expands.

According to the results of a basic test, the excess air ratio λ was maintained at 2.3 owing to a supercharging operation (supercharging operation capable of supplying air in the quantity of around 1.8 times that in a regular case into the interior of a combustion chamber) of about 80 kPa, and an output corresponding to a full load on a regular non-supercharging diesel engine could be secured. Moreover, obtaining a further increased high output is possible by carrying out a higher-level supercharging operation.

In the premixed compression ignition type internal combustion engine in this embodiment, the supercharging of air is controlled by the VG turbocharger in accordance with the inside-cylinder average excess air ratio λ. Accordingly, supercharged air is not supplied to the interior of the combustion chamber while it is not required but it can be supplied thereinto only when it is required. Therefore, an efficient supercharging operation can be carried out. The supercharger (air supply unit) used in the present invention is not limited to the VG turbocharger but any type of supercharger may be used. Especially, when a supercharger driven by engine power is used, suppression of an engine output loss and reduction of fuel consumption can be effected by adapting the supercharger to be inoperable in the operational condition of the engine in which the supercharged air is not required.

In other words, the ECU30 can control the VG turbocharger 9 and fuel injection pump 21 in accordance with the loaded condition of the engine. The ECU30 moves the control valves 12, 13 in the opening direction in a low load operational region to weaken the supercharging power, whereby a control operation for bringing the fuel injection time closer to a compression top dead center TDC is carried out. It moves the control valves 12, 13 in the closing direction in a high load operational region to strengthen the supercharging power, whereby a control operation for bringing the fuel injection time closer to a compression bottom dead center BDC is carried out. Therefore, a control operation, in which the fuel injection time and the supercharging of the air during an operation of the engine are harmonized with each other, can be carried out, and the reduction of NOx can be effected irrespective of the loaded condition of the engine.

Other types of superchargers (air supply units) include a supercharger in which the air is supplied to a suction pipe 10 by a pump, etc., and a supercharger in which an air nozzle is provided in a combustion chamber 1 so as to supply air directly thereinto.

In the above-described embodiment, a case where the supercharging of air by the VG turbocharger 9 is controlled in accordance with the inside-cylinder average excess air ratio $\lambda$ is described, but the present invention is not limited to this case. The supercharging of air by the VG may also be controlled in accordance with the loaded condition of the engine.

Figure 5:
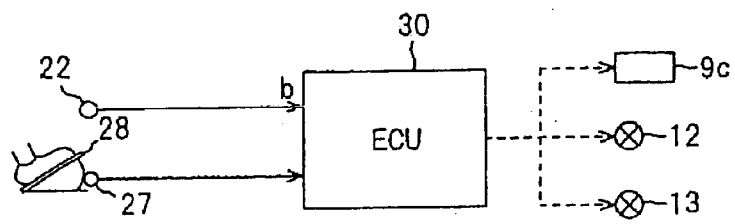
FIG. 5 is a block diagram showing another construction of the ECU.
Figure 6:
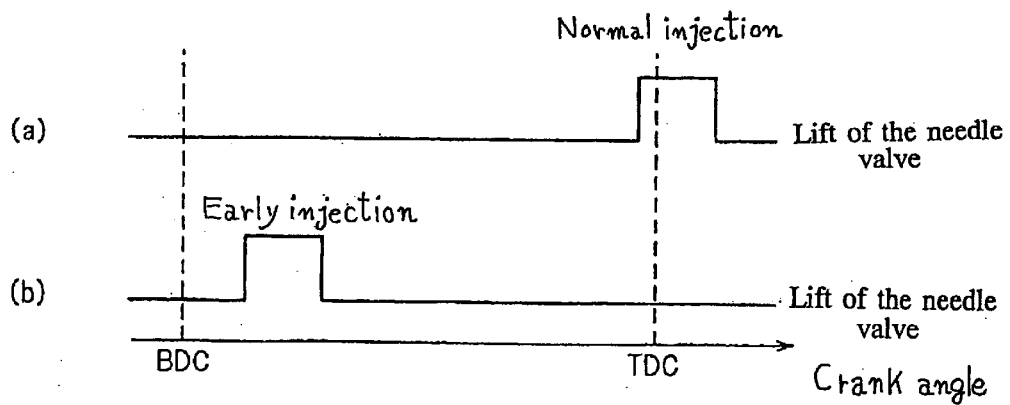
FIG. 6 is a time chart showing a comparison between the fuel injection time of the regular diesel engine and that of the premixed compression ignition type internal combustion engine.

Namely, as shown in FIG. 5, the rotational speed (b) of the engine, detected by the crank angle sensor 22, and accelerating condition (i) are inputted into the ECU30. The accelerating condition (i) is a depression amount of the accelerator 28 detected by the degree of opening of the accelerator sensor 27 provided on the accelerator pedal 28.

In the ECU30, the rotational speed (b) of the engine and accelerating condition (i) are inputted first from the crank angle sensor 22 and degree of opening of accelerator sensor 27, respectively, and the load condition of the engine is detected (engine load detecting unit) on the basis of this information. This load condition of the engine and a predetermined load (output) value (for example, the output P shown in FIG. 4) at which the occurrence of knocking is predicted are then compared with each other.

As a result, when a judgement that the load condition of the engine is at a level lower than a predetermined level and in a low-load condition is given, the air supply condition is put in a non-supercharging condition without carrying out a supercharging operation by the VG turbocharger 9. In the meantime, a judgement that the load condition of the engine is at a level not lower than the predetermined level and in a high-load condition is given, a supercharging operation by the VG turbocharger 9 is carried out to maintain the excess air ratio $\lambda$ at a high level.

Therefore, in this ECU30, the supercharging operation is controlled by the VG turbocharger 9 in accordance with the load condition of the engine, and, therefore, the supercharged air can be supplied to the interior of the combustion chamber 1 by the VG turbocharger 9 only during a high-load operation, in which a large engine output is required with the quantity of a fuel supplied to the interior of a combustion chamber 1 being large. This prevents occurrence of knocking even during a high-load operation, obtains premixed compression ignition combustion (extra-low NOx combustion) of a high output corresponding to an increase in the quantity of the fuel, and attains the suppression of an engine output loss and the reduction of fuel consumption without carrying out a wasteful supercharging operation during a low-load operation.

The present invention can be applied not only to the above-described premixed compression ignition type internal combustion engine of a system in which a gaseous mixture is injected early and directly into a combustion chamber, but also to a premixed compression ignition type internal combustion engine of a system in which a fuel is injected into a suction pipe to form a gaseous mixture with this gaseous mixture taken into a combustion chamber in a suction stroke. In the latter case, the supplying of a fuel is naturally finished before a piston reaches a compression top dead center TDC.

The invention being thus described, it will be obvious that the same may be varied in many ways. Such variation are not to be regarded as a departure from the spirit and scope of the invention, and all such modification as would be obvious to one skilled in the art are intended to be included within the scope of the following claims.

What is claimed is:

1. A control apparatus for a premixed compression ignition type internal combustion engine, comprising:

a fuel injection valve provided in the engine;

an operational condition detecting unit arranged to detect at least one operational condition of the engine;

a fuel injection control unit for controlling the fuel injection valve on the basis of the detected at least one operational condition, the fuel injection control unit controlling the fuel injection valve so as to initiate fuel injection at an early time instant, before the time at which a piston reaches a compression top dead center, for high load conditions as compared to low load conditions, and so that the supplying of a fuel to a combustion chamber is finished at least before a piston reaches a compression top dead center;

an air supply unit capable of supplying pressurized air into the combustion chamber; and an air quantity control unit arranged to control the air supply unit, the air quantity control unit controlling a quantity of air such that combustion by self-ignition is carried out by a compression effect of the piston when the piston is in the vicinity of the compression top dead center and so that excess air ratio is maintained at a lean mixed state in high load operating conditions.

2. The control apparatus for a premixed compression ignition type internal combustion engine according to claim 1, wherein the air supply unit includes a supercharger provided in the engine.

3. The control apparatus for a premixed compression ignition type internal combustion engine according to claim 2, wherein the supercharger includes a turbocharger, the turbocharger having an exhaust turbine provided in an exhaust pipe of the engine, a compressor provided in a suction pipe of the engine, and a variable nozzle vane provided on the side of the exhaust turbine, the turbocharger being capable of variably controlling a supercharging pressure.

4. The control apparatus for a premixed compression ignition type internal combustion engine according to claim 2, wherein the supercharger includes a mechanical supercharger operated by driving power of the engine, the mechanical supercharger being capable of variably controlling the supercharging pressure.

5. The control apparatus for a premixed compression ignition type internal combustion engine according to claim 2, wherein the supercharger includes an air supply pump arranged to supply pressurized air to the suction pipe of the engine or to a downstream portion of the suction pipe, the air supply pump being capable of variably controlling the air pressure.

6. A control apparatus for a premixed compression ignition type internal combustion engine, comprising:
   a fuel injection valve provided in the engine;
   an operational condition detecting unit arranged to detect at least one operational condition of the engine;
   a fuel injection control unit for controlling the fuel injection valve on the basis of the detected at least one operational condition, the fuel injection control unit controlling the fuel injection valve so that the supplying of a fuel to a combustion chamber is finished at least before a piston reaches a compression top dead center;
   an air supply unit capable of supplying pressurized air into the combustion chamber; and
   an air quantity control unit arranged to control the air supply unit, the air quantity control unit controlling a quantity of air such that combustion by self-ignition is carried out by a compression effect of the piston when the piston is in the vicinity of the compression top dead center, wherein the control apparatus includes an inside-cylinder average excess air ratio calculating unit arranged to calculate an average excess air ratio $\lambda$ on the basis of the detected at least one operational condition, wherein the air quantity control unit controls the air supply unit on the basis of the calculated average excess air ratio $\lambda$.

7. The control apparatus for a premixed compression ignition type internal combustion engine according to claim 6, wherein the control apparatus includes a target excess air ratio setting unit arranged to set a target excess air ratio $\lambda a$ on the basis of the detected at least one operational condition, the target excess air ratio $\lambda a$ being set as a value which does not permit knocking to occur, wherein the air quantity control unit controls the air supply unit and supplies pressurized air when the calculated average excess air ratio $\lambda$ is smaller than the set target excess air ratio $\lambda a$.

8. The control apparatus for a premixed compression ignition type internal combustion engine according to claim 7, wherein the air quantity control unit includes a target air pressure setting unit arranged to set a target pressure of the pressurized air supplied by the air supply unit, the target air pressure setting unit setting the target pressure when the calculated average excess air ratio $\lambda$ is smaller than the set target excess air ratio $\lambda a$, wherein the air quantity control unit controls a supply pressure of the pressurized air supplied by the air supply unit, in such a manner that the supply pressure attains the set target pressure.

9. The control apparatus for a premixed compression ignition type internal combustion engine according to claim 7, wherein the air supply unit includes a supercharger provided in the engine, the supercharger being formed of a turbocharger including an exhaust turbine provided in the exhaust pipe of the engine, a compressor provided in the suction pipe of the engine, and a variable nozzle vane provided on the side of the exhaust turbine, the turbocharger being capable of variably controlling a supercharging pressure, the supercharger including an exhaust bypass pipe communicating an upstream side exhaust pipe and a downstream side exhaust pipe of the exhaust turbine with each other, a suction bypass pipe communicating an upstream side suction pipe and a downstream side suction pipe of the compressor with each other, an exhaust control valve arranged to control opening and closing of the exhaust bypass pipe, and a suction control valve arranged to control opening and closing of the suction bypass pipe.

10. The control apparatus for a premixed compression ignition type internal combustion engine according to claim 9, wherein the air quantity control unit controls at least one of the variable nozzle vane, exhaust control valve, and suction control valve when the calculated average excess air ratio $\lambda$ is smaller than the set target excess air ratio $\lambda a$.

11. The control apparatus for a premixed compression ignition type internal combustion engine according to claim 9, wherein the air quantity control unit controls the exhaust control valve and suction control valve in the respective opening directions, and the fuel injection control unit controls the fuel injection time of the fuel injection valve such that the fuel injection time is brought close to a compression top dead center when the engine is determined to be operating in a low-load condition on the basis of the detected at least one operational condition, and,
   the air quantity control unit controls the exhaust control valve and suction control valve in the respective closing directions and the fuel injection control unit controlling the fuel injection time of the fuel injection valve such that the fuel injection time is brought close to a compression bottom dead center when the engine is determined to be operating in a high-load condition on the basis of the detected at least one operational condition.

12. The control apparatus for a premixed compression ignition type internal combustion engine according to claim 7, wherein the operational condition detecting unit includes an operational history monitor arranged to monitor operational history of the engine, wherein the target excess air ratio setting unit corrects the target excess air ratio $\lambda a$ on the basis of the monitored operational history.

13. The control apparatus for a premixed compression ignition type internal combustion engine according to claim 7, wherein the control apparatus includes an EGR unit having a passage communicating the exhaust pipe and suction pipe of the engine, and a control valve arranged to control a quantity of an exhaust gas passing through the passage, wherein the target excess air ratio setting unit corrects the target excess air ratio $\lambda a$ on the basis of the operational condition of the EGR unit.

14. The control apparatus for a premixed compression ignition type internal combustion engine according to claim 13, wherein the target excess air ratio setting unit sets the target excess air ratio $\lambda a$ to $2.0 < \lambda a < 2.5$ when the EGR unit is not operated, and to $\lambda a \leq 2.0$ when the EGR unit is operated.

15. The control apparatus for a premixed compression ignition type internal combustion engine according to claim 1, wherein the operational condition detecting unit includes an engine load detecting unit arranged to detect an engine load, wherein the air quantity control unit controls the air supply unit in accordance with the detected engine load.

16. The control apparatus for a premixed compression ignition type internal combustion engine according to claim 15, wherein the air quantity control unit controls the air supply unit and supplies the pressurized air to the combustion chamber when the detected engine load exceeds a predetermined level.

17. A control apparatus for a premixed compression ignition type internal combustion engine, comprising:
   a fuel injection valve provided in the engine;
   an operational condition detecting unit arranged to detect at least one operational condition of the engine;

a fuel injection control unit for controlling the fuel injection valve on the basis of the detected at least one operational condition, the fuel injection control unit controlling the fuel injection valve so that the supplying of a fuel to a combustion chamber is finished at least before a piston reaches a compression top dead center;

an air supply unit capable of supplying pressurized air into the combustion chamber; and an air quantity control unit arranged to control the air supply unit, the air quantity control unit controlling a quantity of air such that combustion by self-ignition is carried out by a compression effect of the piston when the piston is in the vicinity of the compression top dead center, wherein the operational condition detecting unit includes an engine speed sensor arranged to detect a rotational speed of the engine, an engine load sensor arranged to detect an engine load, an air temperature sensor arranged to detect a temperature of the air supplied to the interior of the combustion chamber, and an air pressure sensor arranged to detect a pressure of air supplied to the interior of the combustion chamber, the fuel injection control unit including target fuel injection rate setting unit arranged to set a target fuel injection quantity on the basis of the results of the detection by the engine speed sensor, and the engine load sensor, wherein the air quantity control unit calculates the average excess air ratio $\lambda$ of the engine on the basis of the detected rotational speed of the engine, the set target fuel injection quantity, the detected temperature of the air, and the detected pressure of the air and controls the air supply unit in accordance with the calculated average excess air ratio $\lambda$.

18. A control apparatus for a premixed compression ignition type internal combustion engine, comprising:

a fuel injection valve provided in the engine;

an operational condition detecting unit arranged to detect at least one operational condition of the engine, the operational condition detecting unit including an engine temperature sensor arranged to detect a temperature of the engine, and a monitor arranged to monitor operational history of the engine, a fuel injection control unit for controlling the fuel injection valve on the basis of the detected at least one operational condition, the fuel injection control unit controlling the fuel injection valve so that the supplying of a fuel to a combustion chamber is finished at least before a piston reaches a compression top dead center;

an air supply unit capable of supplying pressurized air into the combustion chamber; and an air quantity control unit arranged to control the air supply unit, the air quantity control unit controlling a quantity of air such that combustion by self-ignition is carried out by a compression effect of the piston when the piston is in the vicinity of the compression top dead center, wherein the air quantity control unit sets the target excess air ratio $\lambda a$ on the basis of the information detected by the engine temperature sensor and the operational history monitor respectively, wherein the target excess air ratio $\lambda a$ is set as a value at which knocking does not occur, the air quantity control unit controls the air supply unit and supplies the pressurized air when the calculated average excess air ratio $\lambda$ is smaller than the set target excess air ratio $\lambda a$.

19. A control method for a premixed compression ignition type internal combustion engine, including:

detecting at least one operational condition of the engine;

controlling a fuel injection valve on the basis of the detected at least one operational condition of the engine, and controlling the fuel injection valve so as to initiate fuel injection at an early time instant, before the time at which a piston reaches a compression top dead center, for high load conditions as compared to low load conditions, and such that the supplying of a fuel to a combustion chamber is finished at least before a piston reaches a compression top dead center;

supplying pressurized air to the combustion chamber; and controlling a supply rate of the pressurized air to carry out combustion by self-ignition by a compressing effect of the piston when the piston is in the vicinity of the compression top dead center and to maintain excess air ratio at a lean mixed state in high load operating condition.

20. A control method for a premixed compression ignition type internal combustion engine, including:

detecting at least one operational condition of the engine;

controlling a fuel injection valve on the basis of the detected at least one operational condition of the engine, and controlling the fuel injection valve such that the supplying of a fuel to a combustion chamber is finished at least before a piston reaches a compression top dead center, supplying pressurized air to the combustion chamber; and controlling a supply rate of the pressurized air to carry out combustion by self-ignition by a compressing effect of the piston when the piston is in the vicinity of the compression top dead center, wherein the controlling step includes the step of calculating an average excess air ratio $\lambda$ of the engine on the basis of the detected at least one operational condition of the engine, and controlling a supply rate of the pressurized air on the basis of the calculated average excess air ratio $\lambda$.

21. The control method for a premixed compression ignition type internal combustion engine according to claim 20, wherein the controlling step includes the step of setting the target excess air ratio $\lambda a$ on the basis of the detected at least one operational condition of the engine, the target excess air ratio $\lambda a$ being set as a value which does not permit knocking to occur, and controlling the supply rate of the pressurized air when the calculated average excess ratio $\lambda$ is smaller than the set target excess air ratio $\lambda a$.

22. The control method for a premixed compression ignition type internal combustion engine according to claim 21, wherein the controlling step includes the step of setting a target pressure of the pressurized air, and controlling a supply pressure of the pressurized air such that the supply pressure attains the set target pressure.

23. The control method for a premixed compression ignition type internal combustion engine according to claim 21, wherein the engine includes an EGR unit having a passage communicating an exhaust pipe and a suction pipe of the engine, and a control valve for controlling a quantity of an exhaust gas passing through the passage, wherein the controlling step sets the target excess air ratio $\lambda a$ to $2.0 < a < 2.5$ when the EGR unit is not operated, and to $\lambda a \leq 2.0$ when the EGR unit is in operation.

24. The control method for a premixed compression ignition type internal combustion engine according to claim 21, wherein the engine includes a turbocharger having an exhaust turbine provided in an exhaust pipe of the engine, a compressor provided in the suction pipe of the engine, and a variable nozzle vane provided on the side of the exhaust turbine, the turbocharger being capable of variably controlling a supercharging pressure; an exhaust bypass pipe communicating the upstream side exhaust pipe and downstream side exhaust pipe of the exhaust turbine with each other; a suction bypass pipe communicating the upstream side suction pipe and downstream side suction pipe of the compressor with each other; an exhaust control valve for controlling the opening and closing of the exhaust bypass pipe; and a suction control valve for controlling the opening and closing of the suction bypass pipe, wherein the controlling step includes the step of adjusting at least one of the variable nozzle vane, the exhaust control valve and the suction control valve when the calculated average excess air ratio $\lambda$ is smaller than the set target excess air ratio $\lambda a$.

25. The control method for a premixed compression ignition type internal combustion engine according to claim 24, wherein the adjusting step includes the steps of controlling the exhaust control valve and suction control valve in the opening direction respectively, controlling the fuel injection time to the combustion chamber such that it is brought close to the compression top dead center when the operational condition of the engine is in a low-load condition, and controlling the exhaust control valve and suction control valve in the closing direction respectively, wherein the fuel injection time controlling step includes the step of controlling the fuel injection time to the combustion chamber such that the fuel injection time is brought close to the compression bottom dead center when the operational condition of the engine is in a high-load condition.

26. The control method for a premixed compression ignition type internal combustion engine according to claim 19, wherein the detecting step includes the step of detecting a load of the engine, and the controlling step includes the step of controlling a supply rate of the pressurized air in accordance with the detected engine load.

27. The control method for a premixed compression ignition type internal combustion engine according to claim 26, wherein the controlling step includes the step of controlling the supply rate of the pressurized air when the detected engine load exceeds a predetermined level set in advance.

* * * * *